Figure 1:
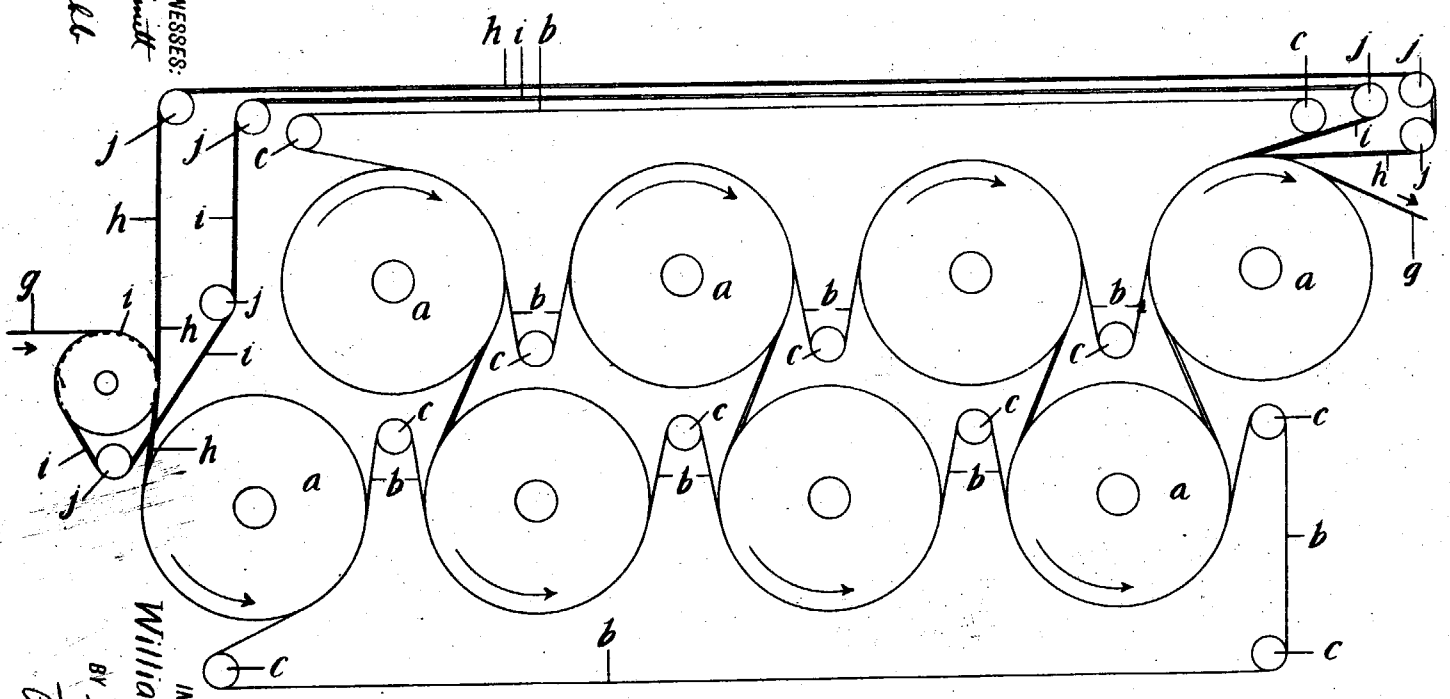

W. SHEAHAN.

DRIER-ROLLS FOR PAPER MACHINES.

APPLICATION FILED NOV. 7, 1914.

Reissued June 8, 1915.

13,925.

2 SHEETS—SHEET 1.

WITNESSES:

Wm. C. Schmitt

D. E. Crabb

INVENTOR

William Sheahan

BY J. Geisler

ATTORNEY

W. SHEAHAN.

DRIER ROLLS FOR PAPER MACHINES.

APPLICATION FILED NOV. 7, 1914.

Reissued June 8, 1915.

13,925.

2 SHEETS—SHEET 2.

WITNESSES:

Wm. C. Schmitt

D. E. Crabb

INVENTOR

William Sheahan,

BY T. J. Geisler

ATTORNEY

UNITED STATES PATENT OFFICE.

WILLIAM SHEAHAN, OF OREGON CITY, OREGON

DRIER-ROLLS FOR PAPER-MACHINES.

13,925. Specification of Reissued Letters Patent. Reissued June 8, 1915.

Original No. 1,104,759, dated July 21, 1914, Serial No. 777,600. Application for reissue filed November 7, 1914. Serial No. 870,917.

*To all whom it may concern:*

Be it known that I, WILLIAM SHEAHAN, a citizen of the United States, and a resident of Oregon City, county of Clackamas, State of Oregon, have invented a new and useful Improvement in Drier-Rolls for Paper-Machines, of which the following is a specification.

My invention relates to paper making, and particularly to paper making machines wherein the paper web after leaving the press rolls is run over a series of drier rolls between drier felts. In the first stages of these machines the leading end of the paper web had to be thrown between the felts by the operator, in order to conduct the paper web from one to the other of the drier rolls. In the later improvements, endless tapes were provided for conveying the leading end of the paper web from roll to roll. The difficulty with such means of conveying the paper web from roll to roll is, that it lacked means for causing the tapes to run at the proper speed relatively to the roller over which they are running, and in consequence there was a tendency of the web of paper being torn. The tapes for conveying the paper web from one drier roll to another could not be successfully run on the periphery of such drier rolls for several reasons which are manifest when pointed out; for example, if the tapes are run on a surface lying in the same plane as that on which the drier felt is running, the latter would have a tendency to run on the higher surface produced on the periphery of the drier rolls by the tapes, and the tapes, running over the web of paper, having a slightly greater speed than the drier rolls, would have a tendency to tear the paper web, especially at the point where such overlying tapes pass from one drier roll to another. Furthermore, the edges of the paper web nearest the tapes are held slightly spaced from the periphery of the drier roll, and thus there would be a tendency to cause imperfect drying of the paper web.

In another case the difference in speed referred to was sought to be adjusted by providing an extension at one end of the drier rolls for carrying the tapes or carriers and sinking the surface of such extension below the periphery of the drier rolls, relatively to the thickness of the carriers, so that the upper face of the carrier would lie in the same plane as that of the periphery of the drier rolls. But two tapes being necessarily used, one rode on the other, and furthermore, by this arrangement, the positions of these tapes or carriers became interchanged in passing from one drier roll to the other, so that the tape which rode directly on the sunken surface of one drier roll, in one instance, in the next instance changed its position and became the overlying tape. In short, each of the tapes was alternately an overlying and an underlying carrier, and this caused inequality and disproportionate speed of the carriers and stretching of the latter, which being taken up from time to time finally imposed such stress on the carriers as to cause them to break.

To avoid such effects is the object of my invention.

I attain my object by providing at the ends of the drier rolls peripheral surfaces sunken below those of the body of the roll, the tape-carrying faces of such sunken surfaces being located in a plane determined by the thickness of the tapes, and wide enough to accommodate two tapes or carriers side by side, so as to cause the tapes to travel at the same speed as the carrier rolls while traveling on the latter.

The details of my invention are hereinafter fully described.

Figure 2:
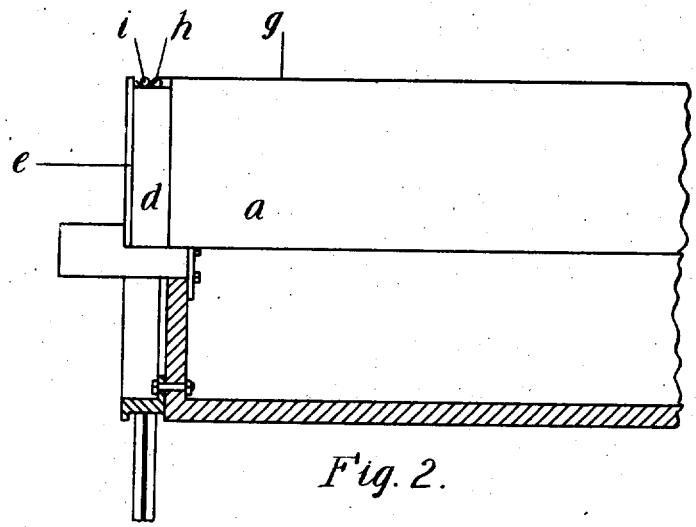
Figure 3:
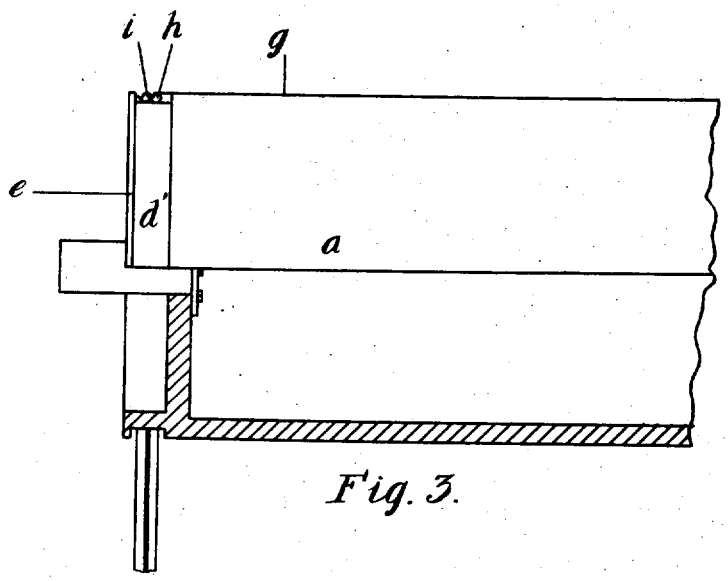

In the accompanying drawings: Figure 1 is a diagrammatic side elevation of the drier section of a paper machine, indicating by arrows the direction of travel of the drier rolls; Fig. 2 is a side elevation, partly in section, of one end of one of the drier rolls, illustrating the construction of the sunken peripheral surfaces for carrying the tapes by which the leading end of the paper web is conducted from one drier roll to the other; and Fig. 3 is a view similar to that shown in Fig. 2, showing that the sunken end may be made integral with the drier roll, instead of being obtained by means of an attachment to the ends of the drier rolls, as shown in Fig. 2.

In Fig. 1, *a*, represents diagrammatically a plurality of drier rolls journaled in staggered form, positively driven in the direction indicated by the arrow in this figure by suitable means, not shown in the drawings. The endless drier felts, *b*, run over the idler, *c*, and over and with said drier rolls, the felts being moved by their frictional contact with the drier rolls.

Referring now to Fig. 2, this shows pieces as bolted to the ends of each drier roll, the end of the drier roll not shown being understood to be identical with that shown. The purpose of such end-pieces, *d*, is to provide peripheral surfaces at the ends of the drier rolls sunken below the peripheral surface of the main body of the roll, for carrying the endless tapes or carriers by which the leading end of the web of paper is carried from one drier roll to the other. The tape or carrier carrying faces of said sunken surfaces must be located so much below the surface of the body of the rolls as to cause the outer surfaces of the tapes to travel at the same speed as the outer surfaces of the carrier rolls by which they are supported. At the starting end of the drier section (having reference to the left end of Fig. 1) is provided the usual "baby drier" which is understood to be located directly in front of the press rolls (not shown) and the paper web, *g*, is supposed to be fed from the press rolls to and over said "baby drier." The endless tapes or carriers, *h*, *i*, run parallel, side by side, over all the drier rolls, in said sunken surface ends. I prefer to use carriers of circular cross-section, as shown, for flat carriers have a tendency to climb one on the other, and such action would interfere with the utility of my invention. I also prefer to make the sunken peripheral surface ends with flanges, as *e*, at their outer extremities. The tapes, *h*, *i*, are returned to the starting point over the idlers, *j*, *j*. As the paper web, *g*, is delivered from the press rolls its leading end is fed between the tapes or carriers *h*, *i*. The paper web is thence conducted over the drier rolls to the calendar end of the drier section, from whence it is delivered to the next section of the machine. As obvious, the paper web is carried over and around each drier roll without any attention being required from the operator. It may be found desirable to make said surface ends integral with the drier rolls. In such case the construction shown in Fig. 3 will be found convenient. In this view the drier roll is represented by *a'*, the sunken peripheral surface by *d'*, and *e* represents the flange which I preferably provide to prevent the tapes from running off the ends of the sunken surfaces.

I claim:

1. In a paper making machine, the combination of drier rolls made with ends having peripheral surfaces sunken below the peripheral surface of the body of the roll, and endless carriers bearing in such sunken peripheral surfaces side by side, the latter being below the peripheral surface of the body of the rolls by the thickness of the carriers so as to cause the outer surfaces of the carriers to travel approximately at the same speed as the drier rolls while traveling on the latter.

2. In a paper making machine, the combination of drier rolls made with ends having peripheral surfaces sunken below the peripheral surface of the body of the roll, and a flange on the outer extremities of such sunken surfaces, and endless carriers bearing in such sunken peripheral surfaces, side by side, the latter being below the peripheral surface of the body of the rolls by the thickness of the carriers so as to cau the outer surfaces of the carriers to trave. approximately at the same speed as the drier rolls while traveling on the latter.

3. In a paper making machine, the combination with the drier rolls, of pieces affixed to the ends of the rolls, which pieces are made with peripheral surfaces sunken below those of the body of the roll, and endless carriers bearing in such sunken surfaces side by side, the latter being below the peripheral surface of the body of the rolls by the thickness of the carriers so as to cause the outer surfaces of the carriers to travel approximately at the same speed as the drier rolls while traveling on the latter.

4. In a paper making machine, the combination with the drier rolls, of pieces affixed to the ends of the rolls, which pieces are made with peripheral surfaces sunken below those of the body of the roll, and a flange on the outer extremities of such sunken surfaces, and endless carriers bearing in such sunken surfaces side by side, the latter being below the peripheral surface of the body of the rolls by the thickness of the carriers, so as to cause the outer surfaces of the carriers to travel at the same speed as the drier rolls while traveling on the latter.

5. In a machine of the character described, in combination with the drier rolls, endless carriers, and supporting means adapted to bring the carrying surfaces of the carriers in the same plane as that of the periphery of the drier rolls, so as to cause said carriers to travel approximately at the same speed as the latter, said carriers and said supporting means being adapted to cause the former to travel side by side.

6. In a machine of the character described, in combination with the drier rolls, endless carriers of circular cross-section and supporting means adapted to bring the carrying surfaces of the carriers in the same plane as that of the periphery of the drier rolls, so as to cause said carriers to travel approximately at the same speed as the latter, said carriers and said supporting means being adapted to cause the former to travel side by side.

7. In a paper making machine, the combination of drier rolls made with ends having peripheral surfaces sunken below the peripheral surface of the body of the roll, and endless carriers of circular cross-section bearing in such sunken peripheral surfaces side by side, the carrying surfaces of the latter being located in a plane determined by the thickness of the carriers, so as to cause the carriers to travel approximately at the same speed as the drier rolls while traveling on the latter.

WILLIAM SHEAHAN.

Witnesses:
WM. C. SCHMITT,
D. E. CRABB.